(12) United States Patent
Swart et al.

(10) Patent No.: US 8,123,259 B2
(45) Date of Patent: Feb. 28, 2012

(54) LOOSE ANTI-ROTATION LOCK SLEEVE FOR PIPE/FLANGE ASSEMBLY

(75) Inventors: Thomas William Swart, Niskayuna, NY (US); Jeyaruban Selliah Amirtharajah, Niskayuna, NY (US); Jeffrey Louis Palmer, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 12/553,768

(22) Filed: Sep. 3, 2009

(65) Prior Publication Data
US 2011/0052315 A1    Mar. 3, 2011

(51) Int. Cl.
*F16L 25/06* (2006.01)

(52) U.S. Cl. .............................. 285/330; 285/86; 285/89

(58) Field of Classification Search .................... 285/86, 285/89, 91, 330, 404
See application file for complete search history.

(56) References Cited

U.S. PATENT DOCUMENTS

| | | | | |
|---|---|---|---|---|
| 579,643 A | * | 3/1897 | Gleason | 285/330 |
| 1,513,516 A | * | 10/1924 | McCabe et al. | 285/203 |
| 2,275,418 A | * | 3/1942 | Boynton | 285/91 |
| 2,296,198 A | * | 9/1942 | Boynton | 285/91 |
| 2,400,318 A | * | 5/1946 | Rosan | 411/373 |
| 3,189,372 A | * | 6/1965 | Johnson | 285/91 |
| 3,198,555 A | * | 8/1965 | Johnson et al. | 285/91 |
| 3,504,904 A | * | 4/1970 | Galbato et al. | 267/151 |
| 4,501,521 A | * | 2/1985 | Geczy | 411/217 |
| 4,512,596 A | * | 4/1985 | Obrecht | 285/81 |
| 6,267,417 B1 | * | 7/2001 | Fan | 285/330 |
| 6,402,468 B1 | * | 6/2002 | Florin et al. | 415/214.1 |
| 2006/0220380 A1 | | 10/2006 | Yoshino | |
| 2007/0001457 A1 | * | 1/2007 | Aas | 285/401 |

FOREIGN PATENT DOCUMENTS

| | | |
|---|---|---|
| EP | 0743481 A1 | 11/1996 |
| EP | 1849956 A1 | 10/2007 |
| FR | 2867533 A1 | 9/2005 |

OTHER PUBLICATIONS

EP10174746, European Search Report and Written Opinion, Nov. 30, 2010.

\* cited by examiner

*Primary Examiner* — James Hewitt
(74) *Attorney, Agent, or Firm* — Hoffman Warnick LLC; Ernest G. Cusick

(57) ABSTRACT

A loose anti-rotation lock sleeve design for use in a flange and pipe assembly. The design includes a lock sleeve positioned between a pipe and a flange to prevent rotation of the pipe relative to the flange. The lock sleeve includes at least two openings in a first end of the lock sleeve configured to receive at least two pipe pins extending radially outward from the pipe. The lock sleeve further includes at least four openings in a second end of the lock sleeve configured to receive at least four flange pins extending radially inward from the flange.

6 Claims, 2 Drawing Sheets

LOOSE ANTI-ROTATION LOCK SLEEVE FOR PIPE/FLANGE ASSEMBLY

FIELD OF THE INVENTION

The present invention relates generally to flange and pipe assemblies for a steam turbine and more particularly to a loose anti-rotation lock sleeve design for use with flange and pipe assemblies.

BACKGROUND OF THE INVENTION

Existing flange and pipe assemblies include an integral seal sleeve-to-pipe design bolted to a shell flange with a tongue and groove gasket design. Replacement of this design is impractical and can involve removing the existing flange and cutting through the pipe to remove it.

BRIEF DESCRIPTION OF THE INVENTION

Disclosed herein is a loose anti-rotation lock sleeve design for use in a flange and pipe assembly. The design includes a lock sleeve positioned between a pipe and a flange to prevent rotation of the pipe relative to the flange. The lock sleeve includes at least two openings in a first end of the lock sleeve configured to receive at least two pipe pins extending radially outward from the pipe. The lock sleeve further includes at least four openings in a second end of the lock sleeve configured to receive at least four flange pins extending radially inward from the flange.

A first aspect of the invention provides an anti-rotation lock sleeve for use in a flange and pipe assembly, the lock sleeve positioned between a pipe and a flange to at least one of reduce or prevent rotation of the pipe relative to the flange, the lock sleeve comprising: at least two openings in a first end of the lock sleeve configured to receive at least two pipe pins extending radially outward from the pipe; and at least four openings in a second end of the lock sleeve configured to receive at least four flange pins extending radially inward from the flange.

A second aspect of the invention provides an anti-rotation flange and pipe assembly, the assembly comprising: a pipe including at least two pipe pins extending radially outward from the pipe; a flange including at least four flange pins extending radially inward from the flange; and a lock sleeve, positioned between the pipe and the flange to at least one of reduce or prevent rotation of the pipe relative to the flange, the lock sleeve including at least two openings in a first end of the lock sleeve configured to receive the at least two pipe pins and at least four openings in a second end of the lock sleeve configured to receive the at least four flange pins.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
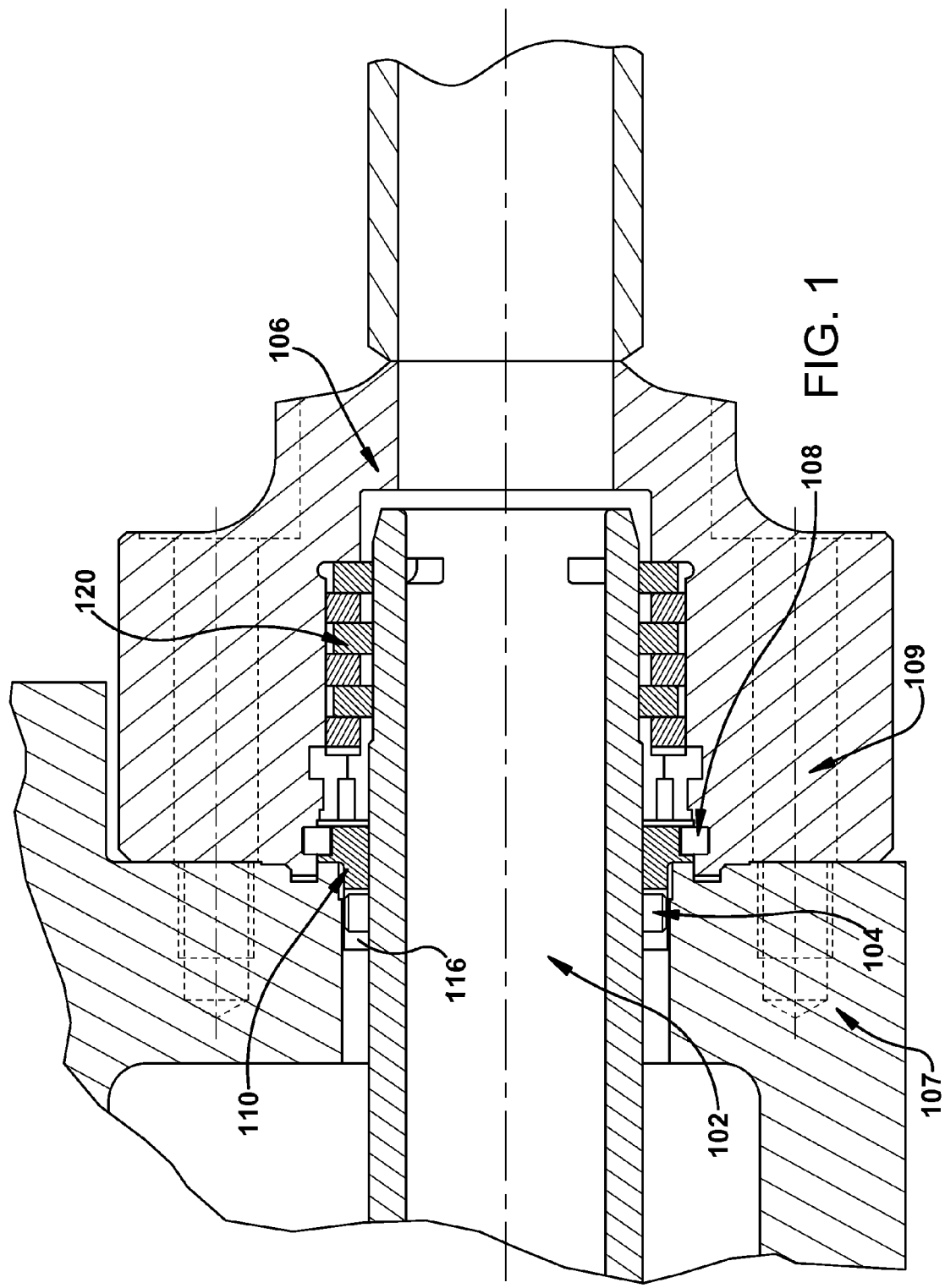
FIG. 1 shows a lock sleeve positioned within a pipe/flange assembly according to an embodiment of the invention.

Turning to FIG. 1, a loose anti-rotation lock sleeve for a pipe/flange assembly according to embodiments of the invention is shown. A pipe 102 is shown in FIG. 1 as a blow down pipe for a large steam turbine, but it is understood that the pipe/flange assembly of the present invention could be used on any pipe needing steam sealing. Pipe 102 includes at least two pipe pins 104 that extend radially outward from pipe 102. Pipe pins 104 can be added to an existing pipe 102 or a new pipe 102 including pipe pins 104 can be used. As shown in FIG. 1, a flange 106 is also provided, including at least four flange pins 108 that extend radially inward from flange 106. Again, flange pins 108 can be added to an existing flange 106 or a new flange 106 including flange pins 108 can be used. As is understood in the art, flange 106 is coupled to an outer shell 107 surrounding pipe 102 via at least one bolt 109.

As also shown in FIG. 1, a lock sleeve 110 according to embodiments of this invention is positioned between pipe 102 and flange 106 to reduce rotation of pipe 102 relative to flange 106 and outer shell 107. As shown in more detail in FIG. 2, lock sleeve 110 includes a first end 112 and a second end 114. First end 112 includes least two openings 116 that are configured to receive pipe pins 104. Second end 114 includes at least four openings 118 that are configured to receive flange pins 108. In one embodiment, an outer diameter of second end 114 is larger than an outer diameter of first end 112.

Openings 116 can be of any suitable shape and size to receive corresponding pipe pins 104. For example, in one embodiment, openings 116 can comprise slots that extend longitudinally from first end 112 of the lock sleeve towards second end 114. As shown in the embodiment in FIG. 2, openings 116 can extend completely through first end 112 from an outer circumference to an inner circumference. Also, as shown in the embodiment in FIG. 2, two openings 116 can be provided, positioned substantially opposite each other, i.e., each positioned 180 degrees apart with respect to each other. The number of openings 116, and their relative position to each other, can be modified as necessary in order to ensure that openings 116 are positioned such that they line up to fit over corresponding radially outward extending pipe pins 104.

Figure 2:
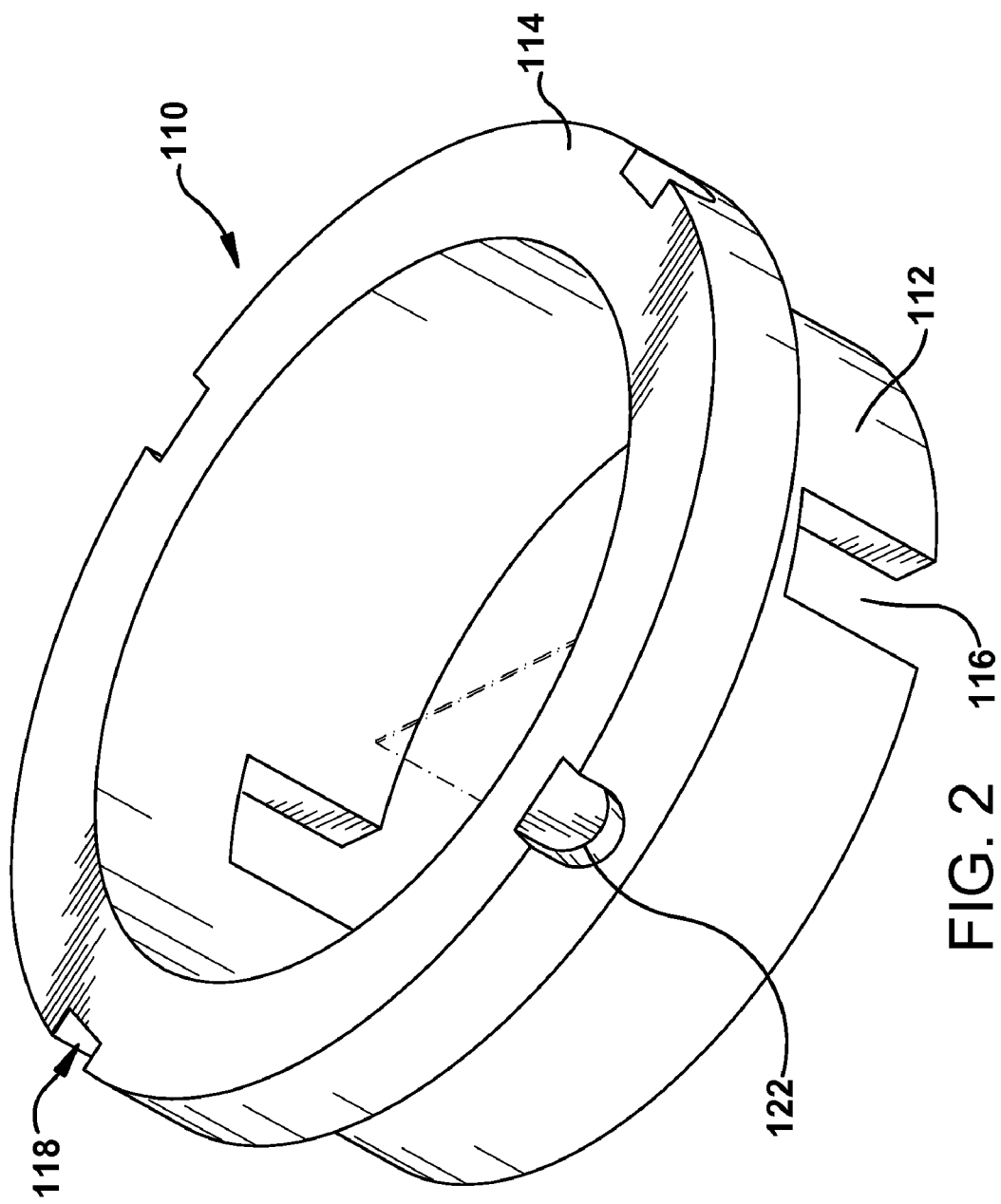
FIG. 2 shows an isometric view of a lock sleeve according to an embodiment of the invention.

Openings 118 can be of any suitable shape and size to receive corresponding flange pins 108. For example, in the embodiment shown in FIG. 2, openings 118 can comprise pockets in the outer circumferential surface of second end 114 that extend radially inward from the outer circumference of second end 114 towards the inner circumference of second end 114. Openings 118 can optionally include at least one curved edge 122, as shown in FIG. 2. As also shown in the embodiment of FIG. 2, openings 118 can comprise at least four openings 118 positioned around the circumference of second end 114. For example, each opening 118 can be positioned 90 degrees apart with respect to each other. The number of openings 118, and their relative position to each other, can be modified as necessary in order to ensure that openings 118 are positioned such that they are aligned to fit over corresponding radially inward extending flange pins 108.

In one embodiment, shown in FIG. 2, openings 116 and openings 118 are staggered with respect to each other, in order to provide enhanced locking between lock sleeve 110 and pipe 102, and lock sleeve 110 and flange 106. Also, as shown in FIG. 1, one or more seals 120 can be provided between lock sleeve 110 and flange 106, or between lock sleeve 110 and pipe 102. It is also noted that lock sleeve 110 is sized such that some amount of clearance is provided between lock sleeve 110 and flange 106, and between lock sleeve 110 and pipe 102, in order to allow limited movement of pipe 102 relative to flange 106 and outer shell 107. In other words, lock sleeve 110 is a loose-fit, not press-fit.

While embodiments of this invention have been discussed in connection with a blow down pipe for a large steam turbine, but it is understood that the pipe/flange assembly of the present invention could be used on any high pressure (HP), intermediate pressure (IP) or combined HP/IP steam turbine with a pipe/flange assembly needing sealing.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An anti-rotation flange and pipe assembly, the assembly comprising:
   a pipe including at least two pipe pins extending radially outward from the pipe;
   a flange including at least four flange pins extending radially inward from the flange; and
   a lock sleeve, positioned between the pipe and the flange to limit rotation of the pipe relative to the flange, the lock sleeve including:
      at least two openings in a first end of the lock sleeve configured to receive the at least two pipe pins, the at least two openings extending completely radially through the first end of the lock sleeve; and
      at least four openings in a second end of the lock sleeve configured to receive the at least four flange pins, the at least four openings including pockets extending only partially radially into the second end of the lock sleeve.

2. The assembly of claim 1, wherein the at least two openings in the first end of the lock sleeve includes two openings positioned about 180 degrees apart with respect to each other.

3. The assembly of claim 1, wherein the at least two openings in the first end of the lock sleeve comprise slots that extend longitudinally from the second end of the lock sleeve towards the first end of the lock sleeve.

4. The assembly of claim 1, wherein the at least four openings in the second end of the lock sleeve are staggered with respect to the at least two openings in the first end.

5. The assembly of claim 1, wherein the at least four openings in the second end of the lock sleeve include four openings positioned about 90 degrees apart with respect to each other.

6. The assembly of claim 1, wherein the lock sleeve is sized such that clearance is provided between the lock sleeve and the flange, and between the lock sleeve and the pipe, in order to allow limited movement of the pipe relative to the flange.

* * * * *